(12) United States Patent
Hirata et al.

(10) Patent No.: US 9,561,641 B2
(45) Date of Patent: Feb. 7, 2017

(54) METHOD AND SYSTEM FOR CONTINUOUSLY MANUFACTURING OPTICAL DISPLAY PANEL

(71) Applicant: NITTO DENKO CORPORATION, Ibaraki-shi, Osaka (JP)

(72) Inventors: Satoshi Hirata, Ibaraki (JP); Seiji Kondo, Ibaraki (JP); Kazuya Hada, Ibaraki (JP); Satoru Koshio, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 442 days.

(21) Appl. No.: 14/237,782

(22) PCT Filed: Aug. 1, 2013

(86) PCT No.: PCT/JP2013/070929
§ 371 (c)(1),
(2) Date: Feb. 7, 2014

(87) PCT Pub. No.: WO2014/024778
PCT Pub. Date: Feb. 13, 2014

(65) Prior Publication Data
US 2016/0221321 A1    Aug. 4, 2016

(30) Foreign Application Priority Data
Aug. 10, 2012  (JP) ................. 2012-178584

(51) Int. Cl.
*B29C 65/48* (2006.01)
*B32B 37/12* (2006.01)
(Continued)

(52) U.S. Cl.
CPC ..... *B32B 38/1883* (2013.01); *B29D 11/00788* (2013.01); *B32B 37/12* (2013.01);
(Continued)

(58) Field of Classification Search
USPC ....... 156/247, 249, 701, 719, 443, 494, 495, 156/537, 538, 541, 555, 750, 767
See application file for complete search history.

(56) References Cited

U.S. PATENT DOCUMENTS

| | | |
|---|---|---|
| 8,128,769 B1 | 3/2012 | Hada et al. |
| 2005/0016670 A1 | 1/2005 | Kanbara et al. |

(Continued)

FOREIGN PATENT DOCUMENTS

| | | |
|---|---|---|
| CN | 1470890 A | 1/2004 |
| CN | 102419489 A | 4/2012 |

(Continued)

OTHER PUBLICATIONS

English Abstract of JP 2011-150328 (Jun. 8, 2016).*
(Continued)

*Primary Examiner* — Sing P Chan
(74) *Attorney, Agent, or Firm* — Westerman, Hattori, Daniels & Adrian, LLP

(57) ABSTRACT

A method for continuously manufacturing an optical display panel includes feeding a carrier film 12 on which an optical film 13 is placed with a pressure-sensitive adhesive interposed therebetween, peeling off the optical film 13 from the carrier film 12 by using a folding-back part 40*a* to inwardly fold back the carrier film 12 being fed, taking up the carrier film 12 from which the optical film 13 is peeled off, feeding an optical cell P and bonding the optical film 13, which is peeled off from the carrier film 12, to the optical cell P with the pressure-sensitive adhesive interposed therebetween, and reducing a difference between a first tension on the carrier film 12 located upstream of the folding-back part 40*a* and a second tension on the carrier film 12 located downstream of the folding-back part while reducing one of the first and second tensions before the bonding step.

10 Claims, 7 Drawing Sheets

(51) Int. Cl.
*B32B 37/26* (2006.01)
*B32B 38/10* (2006.01)
*B32B 38/00* (2006.01)
*B29D 11/00* (2006.01)
*B32B 38/18* (2006.01)
*G02F 1/1335* (2006.01)
*B32B 37/20* (2006.01)

(52) U.S. Cl.
CPC ............ *B32B 37/203* (2013.01); *B32B 38/18* (2013.01); *B32B 38/1825* (2013.01); *G02F 1/133528* (2013.01); *B32B 2037/1246* (2013.01); *B32B 2457/20* (2013.01); *B32B 2551/00* (2013.01)

(56) References Cited

U.S. PATENT DOCUMENTS

| | | | |
|---|---|---|---|
| 2006/0225831 A1 | 10/2006 | Lei et al. | |
| 2009/0279030 A1 | 11/2009 | Toyama et al. | |
| 2010/0300611 A1* | 12/2010 | Yamamoto | B32B 7/06 156/248 |

FOREIGN PATENT DOCUMENTS

| | | | | |
|---|---|---|---|---|
| EP | 2 293 271 A1 | 3/2011 | | |
| JP | 2004-338408 A | 12/2004 | | |
| JP | 2007-304211 A | 11/2007 | | |
| JP | 2008-536177 A | 9/2008 | | |
| JP | 2009-271516 A | 11/2009 | | |
| JP | KR 101034111 B1 * | 5/2011 | ............ | B32B 38/10 |
| JP | 2011-131506 A | 7/2011 | | |
| JP | 2011150328 A * | 8/2011 | .......... | G02F 1/1335 |
| JP | 2012-128409 A | 7/2012 | | |
| TW | 200736050 A | 10/2007 | | |
| WO | 2012/070485 A1 | 5/2012 | | |

OTHER PUBLICATIONS

English Abstract of KR 10-1034111 (Jun. 8, 2016).*
Machine Translation of JP 2011-150328 (Jun. 8, 2016).*
International Search Report dated Aug. 28, 2013, issued in corresponding application No. PCT/JP2013/070979.
Office Action dated Mar. 3, 2016, issued in counterpart Chinese Patent Application No. 201380001609.4, with English translation. (14 pages).
Notification of Transmittal of Translation of the International Preliminary Report on Patentability (Form PCT/IB/338) of International Application No. PCT/JP2013/070929 mailed Feb. 19, 2015 with Forms PCT/IB/373 and PCT/ISA/237 (5 pages).
Taiwanese Search Report mailed Jun. 23, 2016, issued in corresponding Taiwanese Patent Application No. 102128539, with English translation (2 pages).

* cited by examiner

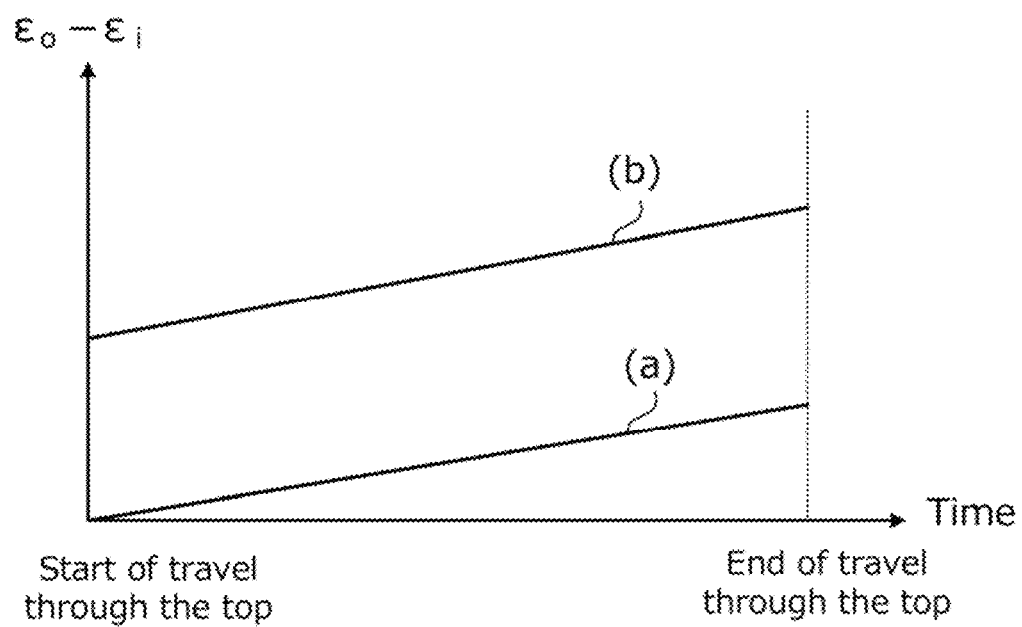

METHOD AND SYSTEM FOR CONTINUOUSLY MANUFACTURING OPTICAL DISPLAY PANEL

FIELD OF THE INVENTION

The invention relates to a method and a system for continuously manufacturing an optical display panel by a process including peeling off an optical film from a carrier film and bonding the optical film to an optical cell with a pressure-sensitive adhesive interposed therebetween to form an optical display panel.

DESCRIPTION OF THE RELATED ART

A known method for bonding an optical film such as a polarizing film to an optical cell with a pressure-sensitive adhesive interposed therebetween includes the following process. A carrier film, on which the optical film is formed with the pressure-sensitive adhesive interposed therebetween, is inwardly folded back at the front end of a peeling unit. Accordingly, the optical film is peeled off together with the pressure-sensitive adhesive from the carrier film. The optical film is then bonded to the optical cell with the pressure-sensitive adhesive interposed therebetween (see, for example, Patent Document 1).

PRIOR ART DOCUMENT

Patent Document

Patent Document 1: JP-A-2011-131506

SUMMARY OF THE INVENTION

Problems to be Solved by the Invention

Unfortunately, it has been found that the method of Patent Document 1 may cause a significant displacement of the optical film being bonded to the optical cell. This problem will be described with reference to the drawings.

FIGS. 8A, 8B, and 8C schematically show the step of peeling off an optical film together with a pressure-sensitive adhesive from a carrier film. The optical film 13, which is placed on the carrier film 12, includes a pressure-sensitive adhesive and an optical film main body. As a take-up unit 60 takes up the carrier film 12 in a direction D2, the optical film 13 formed on the carrier film 12 is transferred in a direction D1 along the face of a peeling unit 40. The peeling unit 40 has a tapered front end 40a, at which the optical film 13 is peeled off together with the pressure-sensitive adhesive from the carrier film 12. The optical film 13 is then bonded to the optical cell P transferred in a direction D3.

The take-up unit 60 is so configured that its rotational velocity is controlled by a control unit (not shown). The length of the carrier film 12 to be taken up in the direction D2 for a certain time is controlled by the control of the rotational velocity.

The velocity at which the optical cell P is fed in the direction D3 is also controlled by the control unit. Specifically, the control unit functions to control the rotational velocity of the take-up unit 60 and the velocity of feed of the optical cell P so that the take-up length of the carrier film 12 can be equal to the travel distance of the optical cell P. This makes it possible to bond the optical film 13 continuously to the target position on each of optical cells P being fed one after another.

In the system described above, a tension in the direction D2 occurs on the carrier film 12 in a region A2. Let this tension be "T2." When the carrier film 12 is pulled by a roller or the like (not shown), a tension in a direction D1' occurs on the carrier film 12 in a region A1. Let this tension be T1. If the intensity of the tension T1 differs from that of the tension T2, a difference can occur between the elongation (hereinafter also referred to as needed as "distortion") of the carrier film 12 in the region A1 and that in the region A2. In this case, the take-up length of the carrier film 12 controlled by the control of the rotational velocity of the take-up unit 60 can differ from the travel distance of the optical cell P. As a result, a positional displacement of the polarizing film 13 being bonded to the optical cell P can occur.

The difference between the elongation (distortion) of the carrier film 12 in the region A1 and that in the region A2 is considered to be caused by the friction force at the front end 40a of the peeling unit 40. This point will be more specifically described with reference to FIG. 8C.

FIG. 8C is a schematic diagram showing the front end 40a of the peeling unit 40 and its vicinity in an enlarged manner. Let the distortion of the carrier film 12 on the side A1 upstream of the front end 40a be $\epsilon_i$, and let the distortion of the carrier film 12 on the side A2 downstream of the front end 40a be $\epsilon_o$. If $\epsilon_i \neq \epsilon_o$, the friction force can locally increase at or near the front end 40a, and the friction force can interfere with smooth feeding of the carrier film 12. In this case, even when the take-up velocity of the carrier film on the downstream side A2 is controlled to be $V_o$ by the control of the rotational velocity of the take-up unit 60, the velocity $V_i$ at or near the top 40p can differ from $V_o$.

The velocity of the optical film 13 on the carrier film 12 can be assumed to be the velocity of the carrier film 12 at the front end 40a. Thus, even though the optical film 13 is intended to be fed at the velocity $V_o$ by the control of the rotational velocity of the take-up unit 60, the optical film 13 can actually be fed at a velocity $V_i$ different from that. On the other hand, the optical cell P will be transferred at the same velocity V, under the assumption that the optical film 13 is intended to be fed at the velocity $V_o$. As a result, the velocity of the front end of the optical film. 13 can differ from the velocity of feed of the optical cell P, so that a displacement can occur in the bonding.

In view of the problems described above, an object of the invention is to provide a method and a system for continuously manufacturing an optical display panel, which make it possible to reduce the level of displacement of an optical film being bonded to an optical cell.

Means for Solving the Problems

As a result of earnest study, it has been found that as mentioned above in the PROBLEMS section, a displacement of an optical film being bonded to an optical cell is caused by a difference between the velocity of feed of the carrier film at the front end (folding-back part) of the peeling unit and the velocity of feed of the carrier film after the peeling off of the optical film. It has also been found that when a process is performed to reduce the difference between a first tension on the carrier film at the front end of the peeling unit and a second tension on the carrier film after the peeling off of the optical film, the difference between the two velocities can be reduced, so that the level of displacement in bonding can be reduced.

Specifically, the invention is directed to a method for continuously manufacturing an optical display panel, including the steps of:

feeding a carrier film on which a pressure-sensitive adhesive-bearing optical film is placed with the pressure-sensitive adhesive interposed therebetween;

peeling off the optical film together with the pressure-sensitive adhesive from the carrier film by using a folding-back part to inwardly fold back the carrier film fed by the feeding step;

taking up the carrier film, from which the optical film is peeled off; bonding the optical film, which is peeled off from the carrier film, to an optical cell with the pressure-sensitive adhesive interposed therebetween by feeding the optical cell; and reducing a difference between a first tension on the carrier film located upstream of the folding-back part and a second tension on the carrier film located downstream of the folding-back part while reducing one of the first and second tensions before the bonding step.

In the step of reducing the difference between the first and second tensions, feed direction-reversing control, feed velocity-increasing or decreasing control, or both of them may be performed on the carrier film located upstream of the folding-back part, the carrier film located downstream of the folding-back part, or both of them. More specifically, the following method may be used.

A method includes feeding backward the carrier film downstream of the folding-back part to reduce the second tension. Another method includes reducing the first tension by performing control to increase the velocity at which the carrier film upstream of the folding-back part is fed. These methods can reduce the difference between the first and second tensions.

The difference between the first and second tensions is preferably reduced to 250 N/m or less.

The invention is also directed to a system for continuously manufacturing an optical display panel, including:

a carrier film feeding unit configured to feed a carrier film on which a pressure-sensitive adhesive-bearing optical film is placed with the pressure-sensitive adhesive interposed therebetween;

a peeling unit configured to peel off the optical film from the carrier film by using a folding-back part to inwardly fold back the carrier film fed by the carrier film feeding unit;

a take-up unit configured to take up the carrier film from which the optical film is peeled off;

an optical cell feeding unit configured to feed an optical cell;

a bonding unit configured to bond the optical film, which is peeled off from the carrier film by the peeling unit, to the optical cell with the pressure-sensitive adhesive interposed therebetween, wherein the optical cell is fed by the optical cell feeding unit; and a drive control unit configured to control a direction in which the carrier film is fed, a velocity at which the carrier film is fed, or both of the direction and the velocity so that a difference between a first tension on the carrier film located upstream of the folding-back part and a second tension on the carrier film located downstream of the folding-back part is reduced.

In addition to the features stated above, the present system may include a first roller unit placed downstream of the folding-back part and configured to feed the carrier film, from which the optical film is peeled off, toward the take-up unit. In this case, when there is a difference between the first and second tensions, the drive control unit may function to reverse the direction of the rotation of the first roller unit before the bonding is performed by the bonding unit. This makes it possible to reduce the difference between the first and second tensions.

The first roller unit may be placed between the peeling unit and the take-up unit. The first roller unit may be used as a take-up roller in the take-up unit, or the first roller unit and a take-up roller may form the take-up unit.

The present system may include a second roller unit placed upstream of the folding-back part and configured to feed the carrier film, on which the optical film is placed, toward the peeling unit. In this case, when there is a difference between the first and second tensions, the drive control unit may function to increase the velocity of the rotation of the second roller unit before the bonding is performed by the bonding unit. This makes it possible to reduce the difference between the first and second tensions.

The second roller unit may be placed upstream of the peeling unit, specifically, in the carrier film feeding unit.

The present system may also have both the first and second roller units. In this case, the drive control unit may also be configured to perform a combination of any of the control operations stated above.

Effect of the Invention

The features of the invention make it possible to reduce the difference between the velocity of feed of the carrier film at the front end of the peeling unit and the velocity of feed of the carrier film after the peeling off of the optical film. This makes it possible to reduce the level of displacement of an optical film being bonded to an optical cell when the displacement occurs due to the velocity difference.

BRIEF DESCRIPTION OF THE DRAWINGS

FIG. 2C is a schematic diagram showing changes in the difference between the distortion $\epsilon_o$ of a carrier film located downstream and the distortion $\epsilon_i$ of the carrier film located upstream during the period from the start to the end of the travel of the carrier film through the top;

DESCRIPTION OF THE EMBODIMENTS

Embodiments of the method and the system of the invention for continuously manufacturing an optical display panel will be described with reference to the drawings. Hereinafter, the method and the system of the invention for continuously manufacturing an optical display panel will be abbreviated as "the present method" and "the present system," respectively, for convenience.

First Embodiment

Hereinafter, a first embodiment of the invention will be described.
[Overall Structure of the System]

Figure 1:
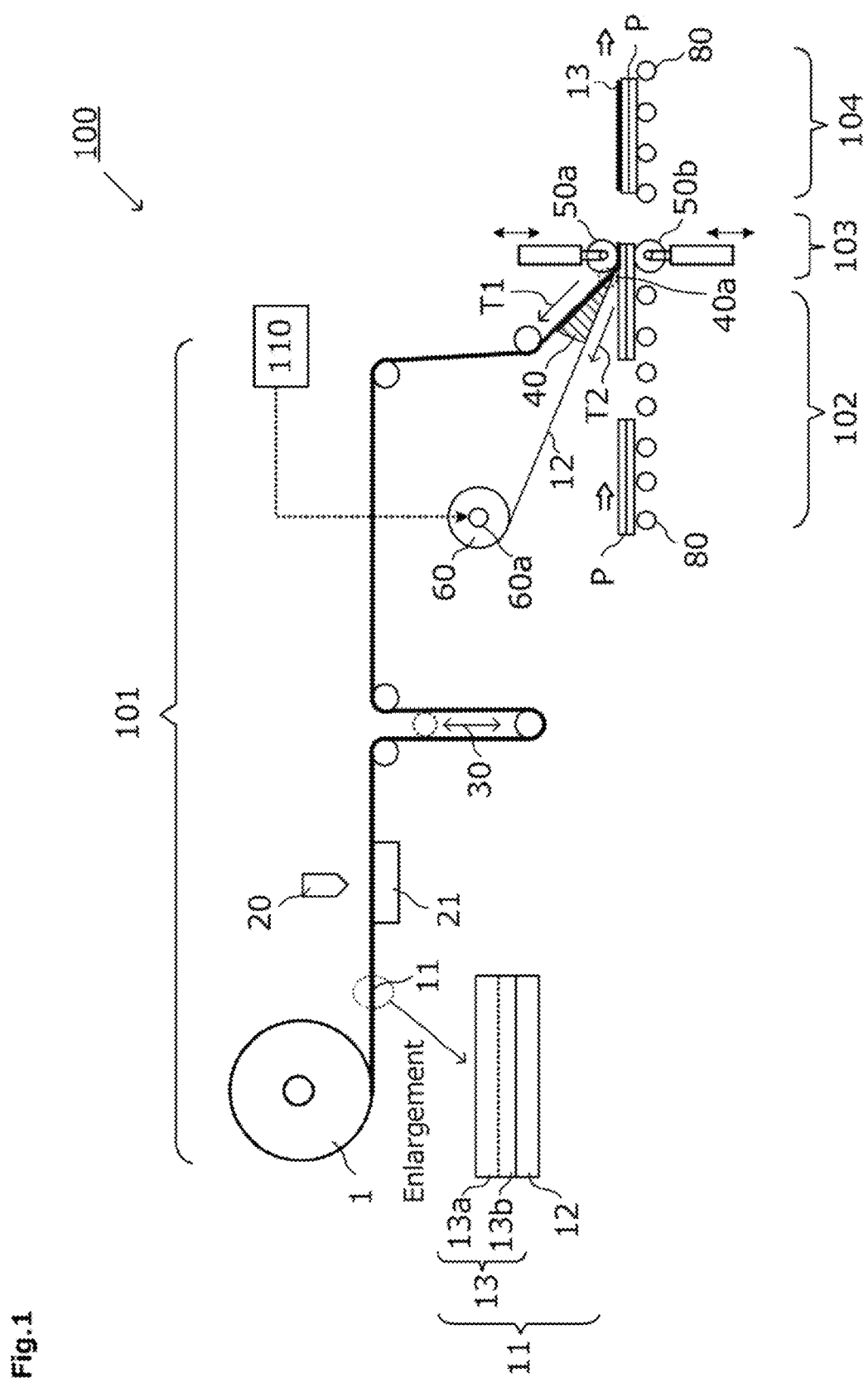
FIG. 1 is a schematic diagram showing a first embodiment of a system for continuously manufacturing an optical display panel.

FIG. 1 is a schematic diagram of the first embodiment of the present system. The present system 100 includes a carrier film feeding unit 101, a peeling unit 40, a first optical cell feeding unit 102, a bonding unit 103, a second optical cell feeding unit 104, a drive control unit 110, and other units.

The carrier film feeing unit 101 is configured to feed a laminated optical film 11 including a carrier film 12 and a pressure-sensitive adhesive-bearing optical film 13 placed thereon. The first optical cell feeding unit 102 is configured to feed an optical cell P. The peeling unit 40 is configured to peel off the pressure-sensitive adhesive layer-bearing optical film 13 from the laminated optical film 11. The bonding unit 103 is configured to bond the optical film 13 to one surface of the optical cell P with the pressure-sensitive adhesive interposed therebetween while the optical cell P is fed by the first optical cell feeding unit 102. The second optical cell feeding unit 104 is configured to further feed downstream the optical cell P with the optical film 13 bonded to its one surface.

The configuration of the part of the system downstream of the second optical cell feeding unit 104 is not shown in FIG. 1. However, the present system 100 may be configured to manufacture an optical display panel by bonding optical films 13 to both sides of the optical cell P. In this case, the present system 100 further includes another carrier film feeding unit, another bonding unit, another peeling unit, and an optical display panel feeding unit downstream of the second optical cell feeding unit 104. Hereinafter, the components of the present system 100 upstream and downstream of the second optical cell feeding unit 104 will be distinguished from each other. For this purpose, the terms "first" and "second" will also be used as prefixes for the upstream and downstream components, respectively. In the description, this style of expression can be used as follows. The optical cell P with the optical film 13 bonded to its one surface by the first bonding unit 103 is turned over (or turned upside down and optionally rotated by 90°) downstream of the second optical cell feeding unit 104. Subsequently, a second bonding unit bonds another optical film to the other surface opposite to the surface to which the optical film 13 has been bonded. Thus, the optical films are bonded to both sides of the optical cell P to form an optical display panel.

A variety of methods may be used to bond the optical film to the optical cell P. As an example, the optical cell P is placed parallel to the horizontal plane, and the first bonding unit 103 bonds the optical film to the upper surface of the optical cell P from above. The optical cell P is then turned upside down so that its surface with no optical film bonded thereto faces upward again. The second bonding unit bonds another optical film to the surface from above.

Alternatively, of course, the optical film may be bonded to the optical cell P from below. In this case, both the first bonding unit 103 and the second bonding unit may be configured to bond the optical film from below, or the first bonding unit 103 and the second bonding unit may be configured to bond the optical films from different directions. The latter case may use a process including bonding the optical film to the optical cell P from above in the first bonding unit 103 and then bonding the optical film to the optical cell P from below in the second bonding unit without turning the optical cell P upside down. Of course, the bonding directions in the first bonding unit 103 and the second bonding unit may be reversed.

Particularly when the optical cell P and the optical film are a liquid crystal cell and a polarizing film, respectively, the directions of polarization of the polarizing films bonded to both sides of the liquid crystal cell P need to be orthogonal to each other. For this purpose, the first bonding unit 103 is configured to bond a (first) optical film in a first bonding direction to a first surface of the optical cell P, and the second bonding unit is configured to bond a (second) optical film in a second bonding direction to a second surface of the optical cell, wherein the second bonding direction is perpendicular to the first bonding direction.

Hereinafter, each component of the present system 100 will be described in detail.
[Film and Roll]

As mentioned above, the carrier film feeding unit 101 is configured to feed a laminated optical film 11 including a carrier film 12 and a pressure-sensitive adhesive-bearing optical film 13 placed thereon. As shown in an enlarged manner in FIG. 1, the laminated optical film 11 is a laminate including the carrier film 12 and the optical film 13 placed thereon. The optical film 13 includes an optical film main body 13a and a pressure-sensitive adhesive layer 13b.

FIG. 1 shows a mode in which the carrier film feeding unit 101 feeds the laminated optical film 11 being unrolled from a roll 1. The roll 1 is a roll of the laminated optical film 11.

More specifically, the roll 1 may be provided in the modes described below.

The roll 1 may be a roll of the laminated optical film 11 including a carrier film 12 and a strip-shaped (or long) optical film 13 provided thereon with a pressure-sensitive adhesive interposed therebetween. In this case, the present system 100 includes a cutting unit 20. The cutting unit 20 is configured to cut the long optical film and the pressure-sensitive adhesive at predetermined intervals while leaving the carrier film 12 uncut. In other words, the cutting unit 20 is configured to perform half-cutting of the laminated optical film 11. In the cutting unit 20, for example, the cutting may also be performed in such a manner as to classify non-defective and defective cut pieces of the optical film based on the result of an inspection performed using a defect inspection apparatus in the continuous manufacturing system.

In another mode, the roll 1 may be a roll of the laminated optical film 11 including a carrier film 12 and optical films 13 formed thereon with a pressure-sensitive adhesive interposed therebetween. Specifically, in this case, score lines are formed in the upper part of the laminated optical film 11 other than the carrier film 12 so as to define each optical film (sheet piece) to be bonded to the optical cell P. In this case, the present system 100 does not necessarily have a cutting unit 20.

A polarizing film may be used as an example of the optical film 13. For example, the polarizing film includes a polarizer (about 1.5 to about 80 μm in thickness) and a polarizer protecting film or films (generally about 1 to about 500 μm in thickness) provided on one or both sides of the polarizer with or without an adhesive interposed therebetween.

Other examples of the optical film 13 that may be used include a retardation film (generally 10 to 200 μm in thickness) such as a λ/4 plate or a λ/2 plate, a viewing angle compensation film, a brightness enhancement film, and a surface protective film. The optical film 13 may also be formed as a multilayer film having two or more film layers, one of which is a polarizing film.

For example, the laminated optical film 11 may have a thickness in the range of 10 μm to 500 μm. The pressure-sensitive adhesive layer 13b interposed between the optical film main body 13a and the carrier film 12 may be formed using any of various materials, such as an acrylic pressure-sensitive adhesive, a silicone pressure-sensitive adhesive, or a urethane pressure-sensitive adhesive. The pressure-sensitive adhesive layer 13b may have a thickness in the range of 10 to 50 μm. As an example, the peel strength between the pressure-sensitive adhesive layer 13b and the carrier film 12 may be, but not limited to, 0.15 (N/50 mm sample width). The peel strength can be measured according to JIS Z 0237.

A known plastic film such as a polyethylene terephthalate film or a polyolefin film may be used as an example of the carrier film 12. The carrier film 12 may also be a conventional film coated as needed with a release agent such as a silicone, long-chain alkyl, or fluoride release agent or a molybdenum sulfide-based release agent.

[Carrier Film Feeding Unit]

The carrier film feeding unit 101 is configured to feed the carrier film 12 downstream. In this embodiment, the carrier film feeding unit 101 has a cutting unit 20. The cutting unit 20 is configured to cut, at predetermined intervals, the laminated optical film 11 being unrolled from the roll 1 while leaving the carrier film 12 uncut. In this cutting, pieces of the optical film 13 each with a size corresponding to that of the optical cell P are formed on the carrier film 12. The cut piece of the optical film 13 is peeled off from the carrier film 12 by the peeling unit 40 and supplied to the bonding unit 103. In this embodiment, the carrier film feeding unit 101 has the cutting unit 20, a dancer roll 30, and a take-up unit 60.

The cutting unit 20 is configured to cut the long optical film 13 into a size corresponding to that of the optical cell P while fixing the laminated optical film 11 from the carrier film 12 side by means of a suction part 21 so that cut pieces of the optical film 13 are formed on the carrier film 12. For example, the cutting unit 20 may be a cutter, a laser, or any other cutting device.

The dancer roll 30 has the function of maintaining the tension on the carrier film 12 in the respective steps including the feeding and bonding steps. The dancer roll 30 allows the tension to be applied more reliably to the optical film 13 from the initial bonding stage. As shown in FIG. 1, the carrier film feeding unit 101 is configured to feed the carrier film 12 to the downstream bonding unit 103 through the dancer roll 30.

The take-up unit 60 has a take-up roller 60a for taking up the carrier film 12 from which the optical film 13 is peeled off by the peeling unit 40. In this embodiment, the drive of the take-up unit 60 is controlled by the drive control unit 110 described below. More specifically, the drive control unit 110 functions to control, for example, the drive of a motor that drives the rotation of the take-up roller 60a of the take-up unit 60. The drive control unit 110 functions to control the direction, speed, start, and stop of the rotation of the motor, respectively. In this embodiment, the take-up roller 60a corresponds to the "first roller unit."

[Peeling Unit]

The peeling unit 40 is provided upstream of the bonding unit 103. The peeling unit 40 is configured to peel off the pressure-sensitive adhesive layer-bearing optical film 13 from the carrier film 12 by using its front end 40a to inwardly fold back the carrier film 12. The front end 40a corresponds to the folding-back part and is hereinafter also referred to as needed as the "folding-back part 40a." FIG. 1 shows a structure in which the peeling unit 40 has a sharp knife edge at its front end. Such a structure, however, is not intended to be limiting.

[First Optical Cell Feeding Unit]

The first optical cell feeding unit 102 is configured to supply the optical cell P to the bonding unit 103 and to feed the optical cell P. In this embodiment, the first optical cell feeding unit 102 has feed rollers 80, suction plates, and other components and is configured to feed the optical cell P to the downstream side of the manufacturing line by rotating the feed rollers 80 or transferring the suction plates. When the first optical cell feeding unit 102 feeds the optical cell P to the bonding position in the bonding unit 103, the bonding of the optical film 13 is performed.

[Bonding Unit]

The bonding unit 103 is configured to bond the optical film 13, which is peeled off from the carrier film 12, to the optical cell P with the pressure-sensitive adhesive interposed therebetween so that an optical display panel is formed. The bonding unit 103 includes a bonding roller 50a and a driving roller (backing roller) 50b. More specifically, at the folding-back part 40a of the peeling unit 40, the optical film 13 is allowed to travel through the top while peeled off from the carrier film 12. Subsequently, after the optical film 13 and the optical cell P are aligned at a specific position, both rollers 50a and 50b apply pressure to bond the optical film 13 to the optical cell P.

The rotation of the driving roller 50b is driven by a motor (not shown). It has a mechanism in which the bonding roller 50a is driven by the rotation of the driving roller 50b. Such a mechanism is non-limiting, and alternatively, the relationship between the driver and the follower may be reversed in the mechanism, or both may be driving mechanisms.

[Second Optical Cell Feeing Unit and Components Downstream Thereof]

The second optical cell feeding unit 104 is configured to feed downstream the optical cell P with the optical film 13 bonded to its one surface by the first bonding unit 103. A turnover mechanism configured to turn the optical cell P upside down and optionally a rotation mechanism configured to horizontally rotate the optical cell P by 90° are provided downstream of the second optical cell feeing unit 104. After the turnover mechanism and optionally the rotation mechanism control the orientation of the optical cell P, the second bonding unit bonds another optical film to the optical cell P.

A series of means for bonding the optical film to the other surface of the optical cell P downstream of the second optical cell feeding unit 104 may be the same as those described above. Specifically, the second carrier film feeding unit may be configured in the same manner as the first carrier film feeding unit, and the second bonding unit may be configured in the same manner as the first bonding unit.

An optical display panel feeding unit (not shown) including feed rolls, suction plates, and other components is provided to feed downstream the optical display panel formed by the second bonding unit. An inspection apparatus for inspecting the optical display panel may also be provided downstream with respect to the feeding. The object of the inspection and the method for the inspection are not restricted with respect to the inspection apparatus.

[Drive Control Unit]

In this embodiment, the drive control unit 110 functions to control the rotation of the take-up roller 60a of the take-up unit 60 as mentioned above. The drive control unit 110 enables the control of the velocity at which the carrier film 12 is fed.

In this embodiment, control is performed in such a manner that while the optical film 13 is allowed to travel through the top from the carrier film 12 in the peeling unit 40, the drive control unit 110 temporarily drives the take-up roller 60a to rotate reversely so that the carrier film 12 downstream of the folding-back part 40a is fed backward. This control is performed in order to reduce a difference between tensions T1 and T2 when in the peeling unit 40, the tension T2 on the carrier film 12 located where the laminated optical film 11 is allowed to travel through the top, specifically, the tension T2 on the carrier film 12 downstream of the folding-back part 40a of the peeling unit 40 (on the take-up unit 60 side) is higher than the tension T1 on the carrier film 12 upstream of the folding-back part 40a. When this control is performed, the tension T2 on the carrier film 12 downstream of the folding-back part 40a is reduced to be closer to the tension T1.

The backward feeding of the carrier film 12, which is achieved by the control exerted by the drive control unit 110, is preferably performed one by one at every stage before each optical cell P is subjected to the bonding process. In this case, a series of operations is repeated, including performing the backward feeding for a small interval while allowing the optical film 13 to travel through the top and then bonding the optical film 13, which is peeled off, to the optical cell P. This timing for the backward feeding is a mere example, and the backward feeding may be performed with different timing.

When the difference in the tension on the carrier film is reduced between the sides downstream and upstream of the folding-back part 40a of the peeling unit 40, the take-up velocity at the take-up unit 60 becomes almost equal to the velocity at which the carrier film 12 is fed immediately before the optical film 13 is peeled off. This makes it possible to bond the optical film 13 to a precise part of the optical cell P in the bonding unit 103 while the optical cell P is continuously fed at a velocity equal to the take-up velocity at the take-up unit 60.

[Theoretical Explanation]

It will be explained with reference to FIG. 8C why the difference in the velocity of the carrier film 12 between the positions immediately before and after the peeling-off of the optical film 13 can be removed by removing the difference in the tension on the carrier film 12 between the sides downstream and upstream of the folding-back part 40a.

Let the distortion of the carrier film 12 on the side A1 upstream of the folding-back part 40a be $\epsilon_i$, and let the distortion of the carrier film 12 on the side A2 downstream of the folding-back part 40a be $\epsilon_o$. Let the velocity at which the carrier film 12 is taken up immediately before it passes through the top 40p of the folding-back part 40a be $V_i$, and let the velocity at which the carrier film 12 is taken up after it passes through the folding-back part 40a, specifically, on the side A2 downstream of the folding-back part 40a be $V_o$.

The carrier film 12 is deformed as it is stretched by the take-up operation. The linear density p of the deformed carrier film 12 is expressed by equation 1 below using the linear density $\rho_a$ of the undeformed carrier film 12 and the distortion $\epsilon$. In equation 1, the distortion $\epsilon$ is the value calculated from the equation $\epsilon = \Delta l/l$, wherein l represents the length of the original carrier film 12, and $\Delta l$ represents the distortion that occurs under a load.

$$\rho = \frac{1}{1+\varepsilon}\rho_a \qquad \text{[Equation 1]}$$

The change $\Delta m$ the weight of the carrier film 12 during a small time interval $\Delta t$ on the side A2 downstream of the folding-back part 40a is defined by equation 2 below. In equation 2, $\rho_i$ represents the linear density of the carrier film 12 immediately before it passes through the top 40p of the folding-back part 40a, and $\rho_o$ represents the linear density of the carrier film after it passes through the folding-back part 40a, specifically, on the side A2 downstream of the folding-back part 40a.

$$\Delta m = [\rho_i(t) \cdot V_i(t) - \rho_o(t) \cdot V_o(t)] \cdot \Delta t \qquad \text{[Equation 2]}$$

The change $\Delta m$ the weight of the carrier film 12 on the side A2 downstream of the folding-back part 40a is expressed by equation 3 based on the change in the linear density. In equation 3 below, $l_o$ represents the length of the carrier film 12 on the side A2 downstream of the folding-back part 40a.

$$\Delta m = \left[\rho_o(t) + \frac{d\rho_o(t)}{dt}\Delta t\right] \cdot l_o - \rho_o(t) \cdot l_o \qquad \text{[Equation 3]}$$

Equation 4 below is derived from equations 2 and 3.

$$\frac{d\rho_o(t)}{dt} \cdot l_o = \rho_i(t) \cdot V_i(t) - \rho_o(t) \cdot V_o(t) \qquad \text{[Equation 4]}$$

Equation 5 below is a modification of equation 1.

$$\frac{d\rho_o(t)}{dt} = -\rho_a[1+\varepsilon_o]^{-2}\frac{d\varepsilon_o}{dt} \qquad \text{[Equation 5]}$$

When equation 4 is modified using equation 5, equation 6 below is obtained.

$$V_i(t) = \frac{1+\varepsilon_i}{1+\varepsilon_o} \cdot V_o(t) - \frac{1+\varepsilon_i}{(1+\varepsilon_o)^2} \cdot \frac{d\varepsilon_o}{dt} \cdot l_o \qquad \text{[Equation 6]}$$

Equation 6 means that as the difference between $\epsilon_i$ and $\epsilon_o$ decreases and as $d_\epsilon o/dt$ (namely, the velocity of the $\epsilon_o$ distortion) decreases, the difference between velocities $V_i$ and $V_o$ can decrease. Therefore, the removal of the difference between the tension T1 (dependent on $\epsilon_i$) on the carrier film 12 on the upstream side and the tension T2 (dependent on $\epsilon_o$) on the carrier film 12 on the downstream side can result in the removal of the difference between the velocity $V_i$ of the carrier film 12 immediately before the peeling-off of the optical film 13 (on the upstream side A1) and the velocity $V_o$ of the carrier film 12 located downstream of the peeling unit 40 (on the downstream side A2) after the peeling-off of the optical film 13. This prevents displacements during the bonding.

Figure 2A:
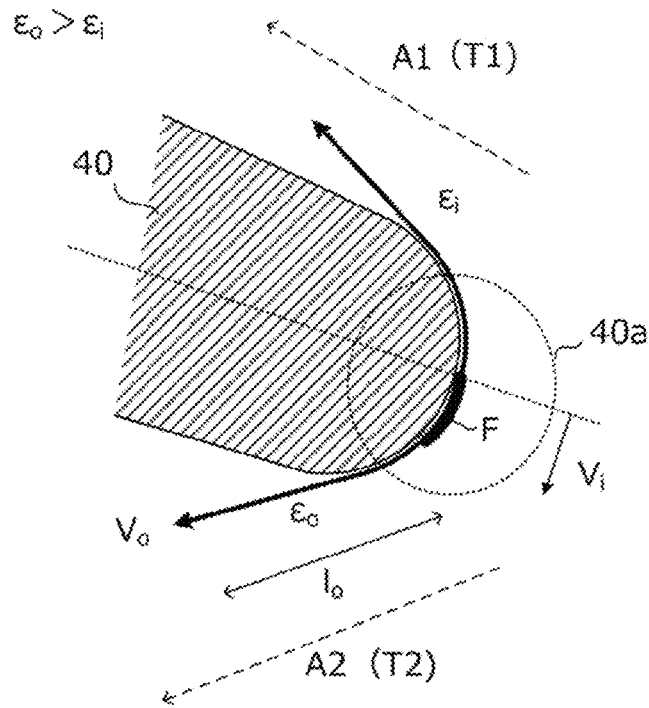
FIG. 2A is a schematic diagram showing the step of peeling off an optical film together with a pressure-sensitive adhesive from a carrier film.
Figure 2B:
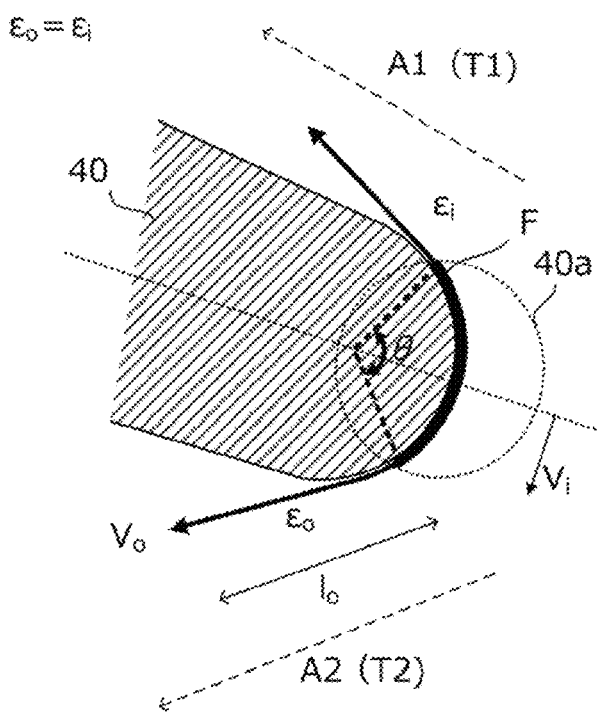
FIG. 2B is a schematic diagram showing the step of peeling off an optical film together with a pressure-sensitive adhesive from a carrier film.
Figure 8A:
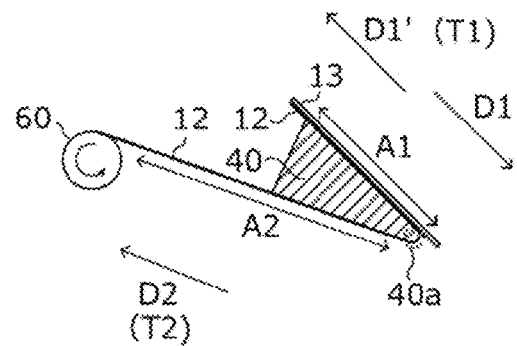
FIG. 8A is a schematic diagram showing the step of peeling off an optical film together with a pressure-sensitive adhesive from a carrier film.
Figure 8B:
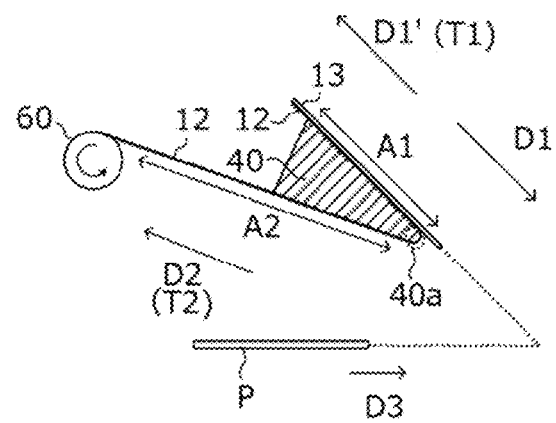
FIG. 8B is a schematic diagram showing the step of peeling off an optical film together with a pressure-sensitive adhesive from a carrier film.
Figure 8C:
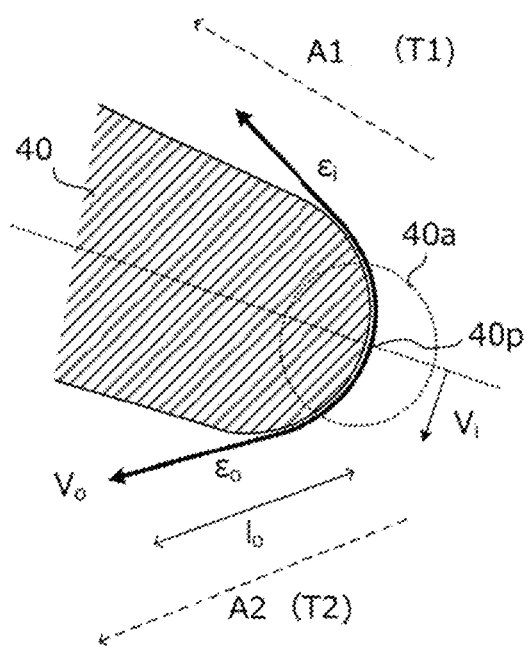
FIG. 8C is a schematic diagram showing the step of peeling off an optical film together with a pressure-sensitive adhesive from a carrier film.

FIGS. 2A and 2B are schematic diagrams showing, in an enlarged manner similarly to FIG. 8C, the front end of the peeling unit 40, specifically, the folding-back part 40a and the vicinity thereof.

It will be explained how $d\epsilon_o/dt$ (the velocity of the $\epsilon_o$ distortion) influences the bonding. In order to reduce $d\epsilon_o/dt$, fluctuations in tension should be reduced. For this purpose, the friction force F at the front end of the peeling unit 40, specifically, at the folding-back part 40a should be reduced. The friction force F is expressed by the equation $F=\epsilon_o-\epsilon_i$. This also means that the removal of the difference between the tensions T1 and T2 will lead to a reduction in $d\epsilon_o/dt$, which can result in the removal of the difference between the velocities $V_i$ and $V_o$.

The equations $F=\epsilon_i(e^{\mu\theta}-1)$ and $F=\epsilon_o(1-1/e^{\mu\theta})$ are further provided, in which $\mu$ represents the coefficient of friction between the front end of the folding-back part 40a and the carrier film 12, and $\theta$ represents the angle of the contact region of the front end of the folding-back part 40a, wherein the contact region is in contact with the carrier film 12. These equations mean that a reduction in $\epsilon_i$ and $\epsilon_o$ leads to a reduction in the friction force F and also leads to the removal of the difference between the velocities $V_i$ and $V_o$.

FIG. 2C is a schematic diagram showing changes in the value $\epsilon_o-\epsilon_i$ during the period from the start to the end of travel of the carrier film 12 through the top, (a) when the upstream distortion $\epsilon_i$ is set equal to the downstream distortion $\epsilon_o$ in the vicinity of the top of the folding-back part 40a, specifically, at the start of travel of the carrier film 12 through the top and (b) when there is a difference between the upstream distortion $\epsilon_i$ and the downstream distortion $\epsilon_o$. FIG. 2C shows that the value $\epsilon_o-\epsilon_i$ is larger in the case (b) when $\epsilon_o-\epsilon_i>0$ already at the start of travel through the top, namely, when there is a distortion difference in the vicinity of the top of the folding-back part 40a.

This suggests that the friction force generated when $\epsilon_o>\epsilon_i$ in the vicinity of the top of the folding-back part 40a should be larger than the friction force generated when $\epsilon_o=\epsilon_i$ and thus the carrier film 12 can be easily stretched on the downstream side A2 during the travel through the top, so that the difference between $\epsilon_i$ and $\epsilon_o$ may increase. As the difference between $\epsilon_i$ and $\epsilon_o$ increases, the difference between $V_i$ and $V_o$ increases. Therefore, the velocity difference becomes larger when $\epsilon_o>\epsilon_i$. Thus, the velocity difference can be reduced by feeding the carrier film 12 backward so that $\epsilon_o=\epsilon_i$ can be satisfied during the travel through the top.

[Continuous Manufacturing Method]

Using the present system 100 described above, a method (present method) for continuously manufacturing an optical display panel is established, including each step described below.

(1) The present method includes the step of feeding the carrier film 12 by means of the carrier film feeding unit 101, wherein the pressure-sensitive adhesive-bearing optical film 13 is placed on the carrier film 12 with the pressure-sensitive adhesive interposed therebetween.

(2) The present method includes the step of peeling off the optical film 13 together with the pressure-sensitive adhesive from the carrier film 12 by using the peeling unit 40 to inwardly fold back the carrier film 12 at the folding-back part 40a while feeding the carrier film 12.

(3) The present method includes the step of taking up the carrier film 12 by means of the take-up unit 60 while peeling off the optical film 13 from the carrier film 12.

(4) The present method includes the step of feeing the optical cell P by means of the optical cell feeding unit 102. The present method also includes the step of bonding, by means of the bonding unit 103, the optical film 13, which is peeled off from the carrier film 12, to the optical cell P with the pressure-sensitive adhesive interposed therebetween when the optical cell P is fed, thereby forming an optical display panel.

(5) The present method includes the step of reducing, by means of the drive control unit 110, the difference between the tension T1 on the carrier film 12 located upstream of the folding-back part 40a and the tension T2 on the carrier film 12 located downstream of the folding-back part 40a while reducing one of the tensions T1 and T2 before the bonding unit 103 performs the bonding (tension control step).

In this embodiment, an example of the tension control step includes feeding the carrier film 12 backward, downstream of the folding-back part 40a, by using the drive control unit 110 to control the rotation of the take-up roller 60a of the take-up unit 60, as mentioned above.

In the embodiment described above, the drive control unit 110 functions to perform the tension control step during the time when the carrier film 12 travels through the top of the folding-back part 40a. However, the tension control step does not always have to be performed during the travel through the top. The tension control step only needs to be performed at least before the bonding of the optical film 13 to the optical cell P. The same applies to each embodiment described below.

Second Embodiment

Hereinafter, a second embodiment of the invention will be described. In the description of each embodiment below, the same elements as those in the first embodiment will be denoted by the same signs, and the description thereof will not be repeated.

Figure 3:
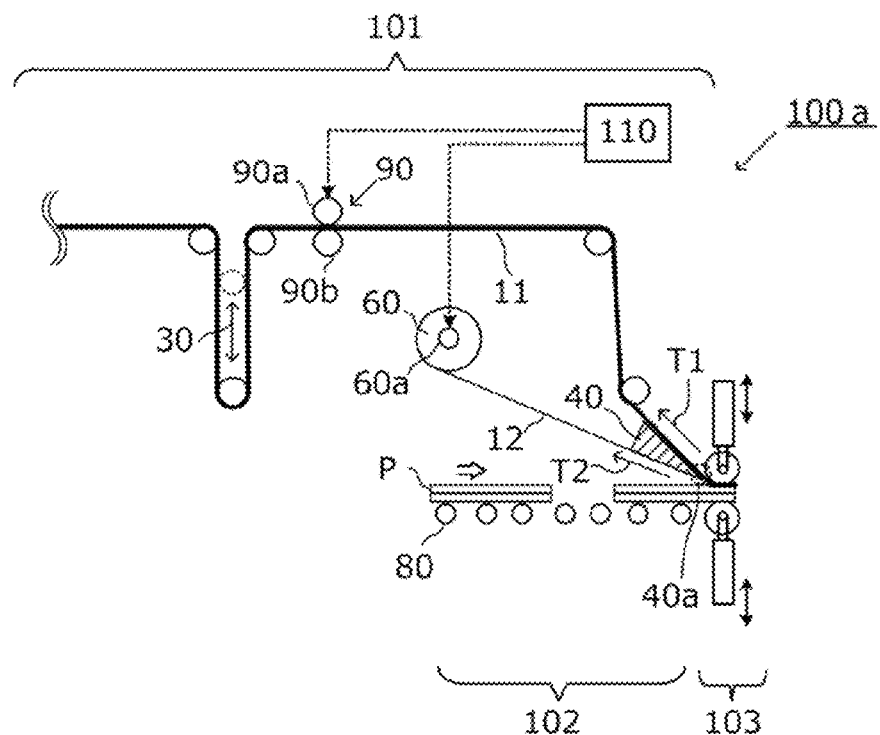
FIG. 3 is a schematic diagram showing part of a second embodiment of a system for continuously manufacturing an optical display panel.

FIG. 3 is a schematic diagram of part of a system 100a according to this embodiment. The present system 100a includes a carrier film feeding unit 101 and a peeling unit 40, wherein the carrier film feeding unit 101 has an upstream-side film supply unit 90 configured to feed the carrier film 12 on the side upstream of the peeling unit 40. The present system 100a also includes a take-up unit 60 and a drive control unit 110 configured to control the take-up unit 60 and the upstream-side film supply unit 90.

The upstream-side film supply unit 90 is placed upstream of the peeling unit 40 with respect to the feeding. More specifically, the upstream-side film supply unit 90 has a drive roller 90a driven and rotated by a motor (not shown) and a follower roller 90b opposed to the drive roller 90a and pushed to the drive roller 90a by biasing means (such as a compression spring or a leaf spring, not shown). While the laminated optical film 11 is held between the drive roller 90a and the follower roller 90b, the rotation of the drive roller 90a is followed by the rotation of the follower roller 90b, so that the laminated optical film 11 is fed to the peeling unit 40 located downstream.

For example, metal, rubber, or resin may be used to form the drive roller 90a and the follower roller 90b as components of the upstream-side film supply unit 90. Any of these materials may be used to form the whole of each roller or to form at least the outer surface of each roller.

More specifically, the drive control unit 110 functions to control the rotation of the take-up roller 60a of the take-up unit 60 as in the first embodiment. In this embodiment, the drive control unit 110 further functions to control the motor that drives the drive roller 90a of the upstream-side film supply unit 90. Specifically, the drive control unit 110 is configured to control the direction of rotation and the rotational velocity of the drive roller 90a. The drive roller 90a corresponds to the "second roller unit."

In this embodiment, when the tension T2 is higher than the tension T1, the drive control unit 110 functions to drive the take-up roller 60a to rotate reversely as in the first embodiment. By this control, the carrier film 12 located where the laminated optical film 11 is allowed to travel through the top, specifically, the carrier film 12 located downstream of the folding-back part 40a of the peeling unit 40 is fed backward, so that the tension T2 is reduced to be closer to the tension T1 on the upstream side.

Also when the tension T2 is lower than the tension T1, the drive control unit 110 provides control to increase the velocity of forward rotation of the drive roller 90a so that the velocity at which the carrier film 12 is fed on the side upstream of the folding-back part 40a is increased. This control reduces the tension T1 so that the difference between the tension T1 and the tension T2 on the downstream side is reduced.

Third Embodiment

Figure 4A:
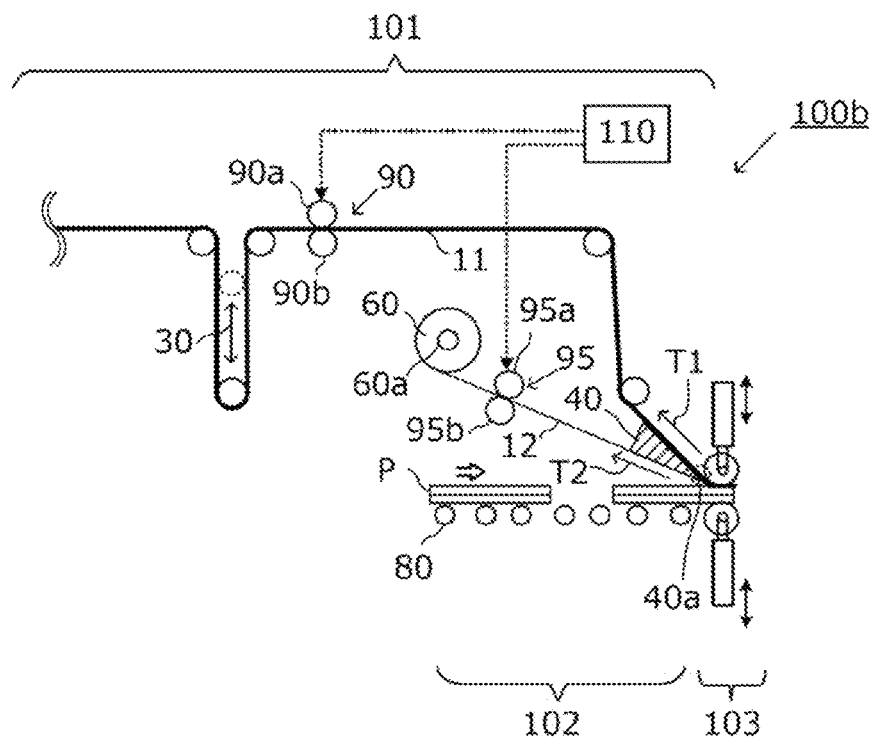
FIG. 4A is a schematic diagram showing part of a third embodiment of a system for continuously manufacturing an optical display panel.

Hereinafter, a third embodiment of the invention will be described. FIG. 4A is a schematic diagram of part of a system 100b according to this embodiment. The present system 100b includes a peeling unit 40, a take-up unit 60, and a downstream-side film supply unit 95 arranged between the peeling unit 40 and the take-up unit 60. Similarly to the upstream-side film supply unit 90, the downstream-side film supply unit 95 has two rollers opposed to each other. Specifically, the downstream-side film supply unit 95 has a drive roller 95a driven and rotated by a motor (not shown) and a follower roller 95b opposed to the drive roller 95a and pushed to the drive roller 95a by biasing means (such as a compression spring or a leaf spring, not shown).

In this embodiment, the drive control unit 110 functions to control the motor that drives the drive roller 90a of the upstream-side film supply unit 90 and also functions to control the motor that drives the drive roller 95a of the downstream-side film supply unit 95. Specifically, the drive control unit 110 is configured to control the direction of rotation and the rotational velocity of the drive rollers 90a and 95a. The drive roller 95a corresponds to the "first roller unit," and the drive roller 90a corresponds to the "second roller unit."

In this embodiment, when the tension T2 is higher than the tension T1, the drive control unit 110 functions to drive the drive roller 95a of the downstream-side film supply unit 95 to rotate reversely. By this control, the carrier film 12 located where the laminated optical film 11 is allowed to travel through the top, specifically, the carrier film 12 located downstream of the folding-back part 40a of the peeling unit 40 is fed backward, so that the tension T2 is reduced to be closer to the tension T1 on the upstream side. On the other hand, when the tension T2 is lower than the tension T1, the drive control unit 110 provides control to increase the velocity of forward rotation of the drive roller 90a of the upstream-side film supply unit 90. This control reduces the tension T1 on the carrier film 12 located upstream of the folding-back part 40a of the peeling unit 40 so that the difference between the tension T1 and the tension T2 on the downstream side is reduced.

Figure 4B:
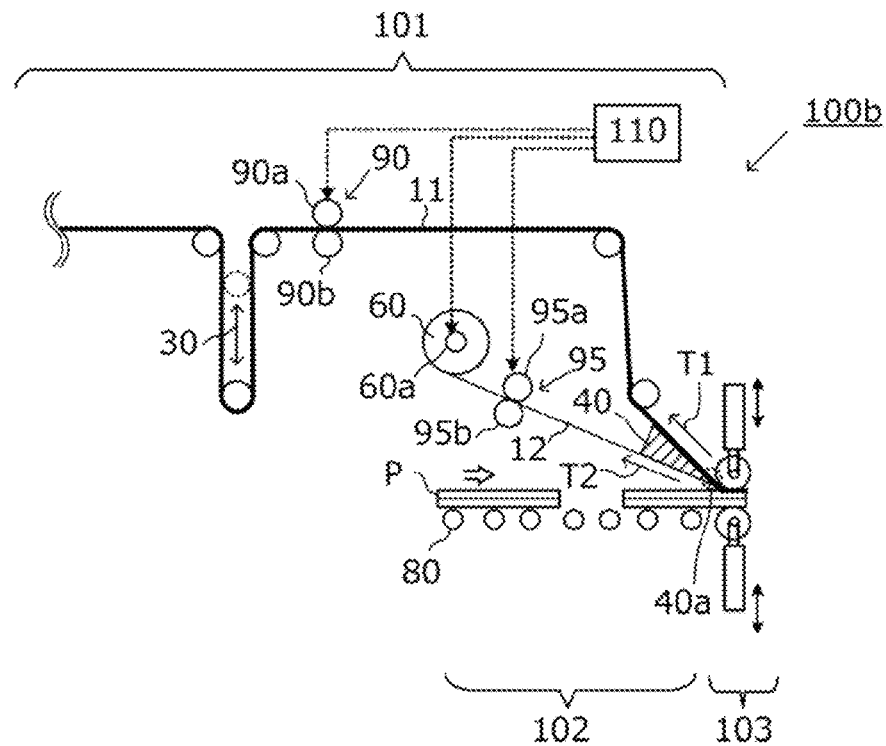
FIG. 4B is another schematic diagram showing part of a third embodiment of a system for continuously manufacturing an optical display panel.

It will be understood that as shown in FIG. 4B, the drive control unit 110 may also be configured to control the rotation of the take-up roller 60a. In this case, the drive control unit 110 may be configured to additionally perform the control described above for the first embodiment.

Fourth Embodiment

Figure 5:
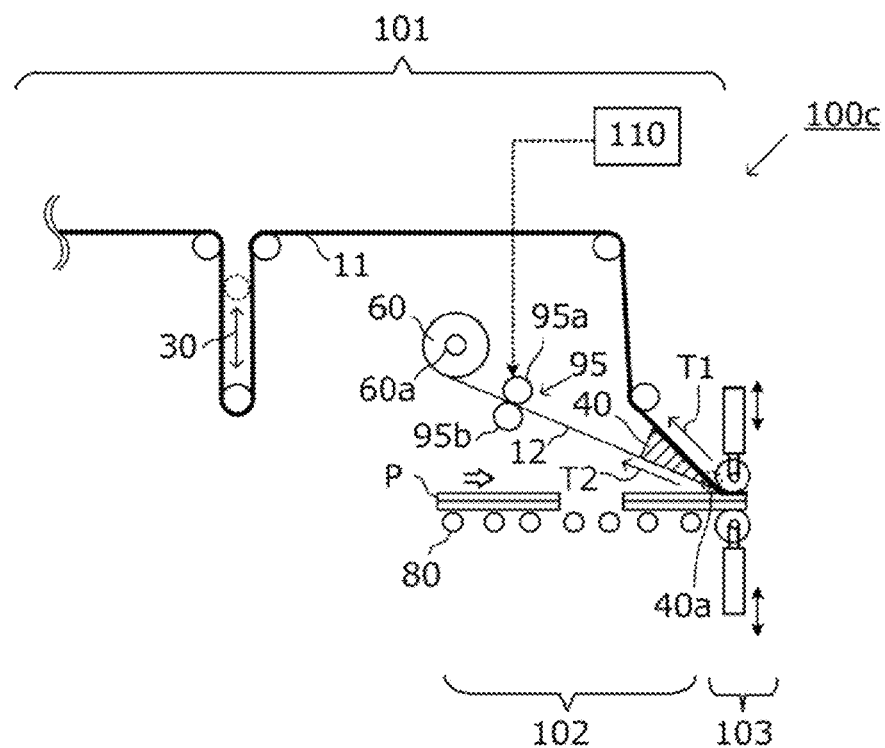
FIG. 5 is a schematic diagram showing part of a fourth embodiment of a system for continuously manufacturing an optical display panel.

Hereinafter, a fourth embodiment of the invention will be described. FIG. 5 is a schematic diagram of part of a system 100c according to this embodiment. The present system 100c has a drive control unit 110 configured to control only the rotation of the drive roller 95a of the downstream-side film supply unit 95. In this embodiment, the drive roller 95a is controlled by the drive control unit 110 in the same manner as the take-up roller 60a is controlled in the first embodiment, and thus a description of thereof will not be repeated.

Fifth Embodiment

Figure 6:
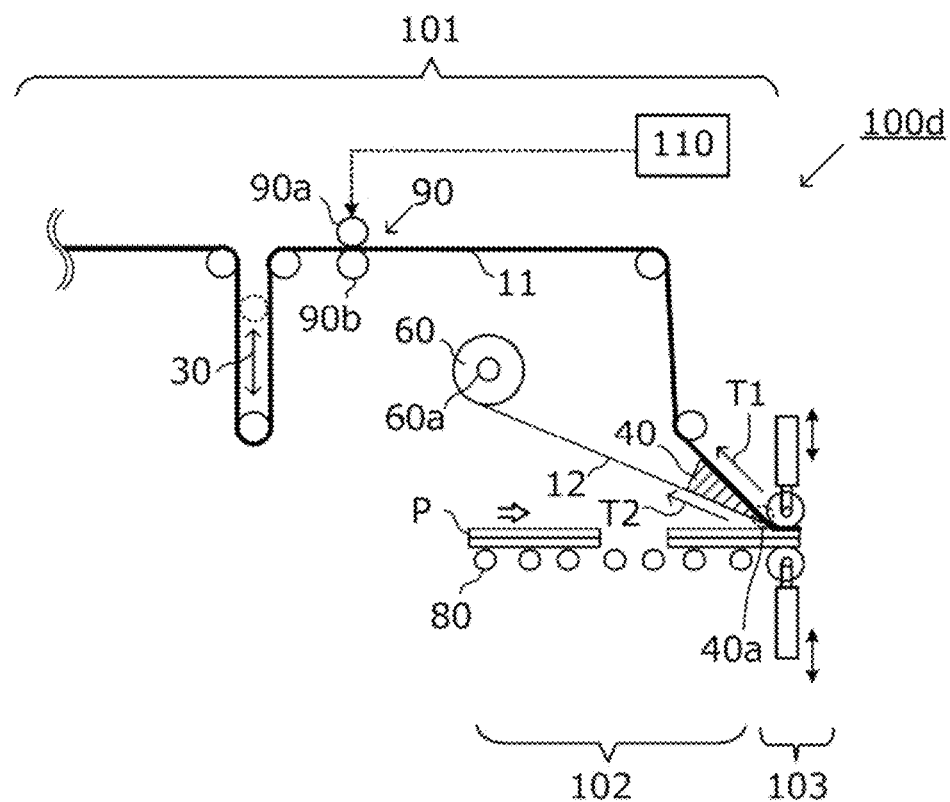
FIG. 6 is a schematic diagram showing part of a fifth embodiment of a system for continuously manufacturing an optical display panel.

Hereinafter, a fifth embodiment of the invention will be described. FIG. 6 is a schematic diagram of part of a system 100d according to this embodiment. The present system 100d has a drive control unit 110 configured to control only the rotation of the drive roller 90a of the upstream-side film supply unit 90. In this embodiment, the drive roller 90a is controlled by the drive control unit 110 in the same manner as the drive roller 90a is controlled in the second and third embodiments, and thus a description of thereof will not be repeated.

Other Embodiments

Hereinafter, other embodiments will be described.

<1> In each embodiment described above, the drive control unit 110 may provides control to reduce the feed velocity instead of providing control to reverse the direction in which the carrier film 12 is fed.

<2> In the systems of the second, third, and fifth embodiments, the upstream-side film supply unit 90 (drive roller 90a) is placed between the dancer roll 30 and the folding-back part 40a. This is for the following reason. If the upstream-side film supply unit 90 is provided upstream of the dancer roll 30 located upstream of the folding-back part 40a, the control for changing the feed velocity by driving the drive roller 90a of the upstream-side film supply unit 90 can hardly change the tension T1 on the side upstream of the folding-back part 40 because the feeding movement is absorbed by the dancer roll 30. However, for example, if the dancer roll 30 is of a suction type for controlling the roll movement, the absorption problem will hardly occur. In this case, the upstream-side film supply unit 90 may be provided upstream of the dancer roll 30, and the control for changing the feed velocity by driving the drive roller 90a of the upstream-side film supply unit 90 can successfully change the tension T1 on the side upstream of the folding-back part 40. Therefore, the upstream-side film supply unit 90 does not always have to be placed between the dancer roll 30 and the folding-back part 40a as shown in FIGS. 3, 4A, 4B, and 6. If the absorption of the feeding movement by the dancer roll 30 has little effect on the tension control, the upstream-side film supply unit may be placed upstream of the dancer roll 30.

EXAMPLES

In the present system 100c shown in FIG. 5, the bonding unit 103 was operated to bond sheet pieces of polarizing film (VEG1724DU manufactured by NITTO DENKO CORPORATION, 400×700 mm) to optical cells of non-alkali glass (manufactured by Corning Incorporated, 405×710 mm) from the long side. In this operation, a process of reducing the difference between the tensions on the carrier film 12 downstream and upstream of the peeling unit 40 was performed in Examples 1 and 2, and not performed in Comparative Example 1. More specifically, the drive roller 95a of the downstream-side film supply unit 95 was reversely rotated for a short time interval with a predetermined timing so that the carrier film 12 located downstream of the folding-back part 40a was fed in the reverse direction (backward feeding).

[Evaluation Method]

(1) The tensions T1 and T2 on the carrier film 12 upstream and downstream of the folding-back part 40a of the peeling unit 40 were measured with a tension detector (LX-050TD manufactured by Mitsubishi Electric Corporation). In Examples 1 and 2, the tensions T1 and T2 were measured immediately after the carrier film 12 downstream of the folding-back part 40a was fed backward.

Figure 7:
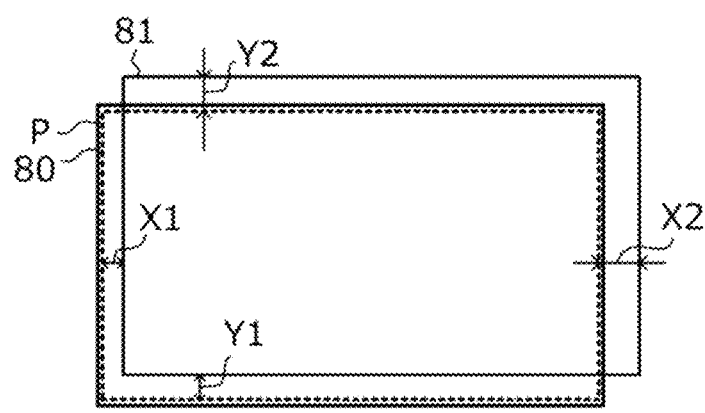
FIG. 7 is a schematic diagram for illustrating a method for measuring displacements in bonding.

(2) After the optical film 13 peeled off by the peeling unit 40 was bonded to the optical cell P by the bonding unit 103, the displacement of the position 81 of the actually bonded film from the target position 80 for the bonding onto the optical cell P was measured with respect to four sides (X1, X2, Y1, and Y2) as shown in FIG. 7. More specifically, in FIG. 7, the displacements X1 and X2 to the right were assigned to be positive and those to the left negative. In FIG. 7, the displacements Y1 and Y2 to the top were assigned to be positive and those to the bottom negative. Each average displacement was calculated when optical films 13 were continuously bonded to 100 optical cells P.

Table 1 shows the results of the evaluation.

TABLE 1

| | Presence or absence of tension reducing process | Tension [N/m] | | | Average displacement [mm] | | | |
|---|---|---|---|---|---|---|---|---|
| | | T1 (upstream side) | T2 (downstream side) | Tension difference [N/m] \|T1 − T2\| | X1 | X2 | Y1 | Y2 |
| Example 1 | Present | 350 | 325 | 25 | 0.24 | 0.28 | −0.29 | −0.22 |
| Example 2 | Present | 375 | 100 | 275 | 0.54 | 0.57 | −0.51 | −0.54 |
| Comparative Example 1 | Absent | 475 | 110 | 365 | 0.8 | 0.92 | −0.83 | −0.79 |

The results in Table 1 show that displacements in the bonding are most significant in Comparative Example 1 where the process of reducing the difference between the tensions T1 and T2 is not performed. In contrast, the amount of displacements in the bonding is reduced in Examples 2 and 1, and the amount of displacements in the bonding is most reduced in Example 1 where the tension difference is more reduced.

DESCRIPTION OF REFERENCE SIGNS

1: Roll
11: Laminated optical film
12: Carrier film
13: Optical film
13a: Optical film main body
13b: Pressure-sensitive adhesive layer
20: Cutting unit
21: Suction part
30: Dancer roll
40: Peeling unit
40a: Front end of peeling unit (folding-back part)
50a: Driving roller
50b: Backing roller
60: Take-up unit
60a: Take-up roller
80: Target bonding position
90: Upstream-side film supply unit
90a: Drive roller of upstream-side film supply unit
90b: Follower roller of upstream-side film supply unit
95: Downstream-side film supply unit
95a: Drive roller of downstream-side film supply unit
95b: Follower roller of downstream-side film supply unit
100, 100a, 100b, 100c, 100d: System for continuously manufacturing optical display panel
101: Carrier film feeding unit
102: First optical cell feeding unit
103: Bonding unit
104: Second optical cell feeding unit
110: Drive control unit
P: Optical cell

The invention claimed is:

1. A method for continuously manufacturing an optical display panel, comprising the steps of:
feeding a carrier film on which a pressure-sensitive adhesive-bearing optical film is placed with the pressure-sensitive adhesive interposed therebetween;
peeling off the optical film together with the pressure-sensitive adhesive from the carrier film by using a folding-back part to inwardly fold back the carrier film fed by the feeding step;
taking up the carrier film, from which the optical film is peeled off;
bonding the optical film, which is peeled off from the carrier film, to an optical cell with the pressure-sensitive adhesive interposed therebetween by feeding the optical cell; and
reducing a difference between a first tension on the carrier film located upstream of the folding-back part and a second tension on the carrier film located downstream of the folding-back part while reducing one of the first and second tensions before the bonding step.

2. The method according to claim 1, wherein the difference between the first and second tensions is reduced by performing feed direction-reversing control, feed velocity-increasing or decreasing control, or both of them on the carrier film located upstream of the folding-back part, the carrier film located downstream of the folding-back part, or both of them.

3. The method according to claim 2, wherein the difference between the first and second tensions is reduced by reducing the second tension by performing control to feed backward the carrier film downstream of the folding-back part or by reducing the first tension by performing control to increase a velocity at which the carrier film upstream of the folding-back part is fed.

4. The method according to claim 3, wherein the difference between the first and second tensions is reduced to 250 N/m or less.

5. The method according to claim 2, wherein the difference between the first and second tensions is reduced to 250 N/m or less.

6. The method according to claim 1, wherein the difference between the first and second tensions is reduced to 250 N/m or less.

7. A system for continuously manufacturing an optical display panel, comprising:
a carrier film feeding unit configured to feed a carrier film on which a pressure-sensitive adhesive-bearing optical film is placed with the pressure-sensitive adhesive interposed therebetween;
a peeling unit configured to peel off the optical film from the carrier film by using a folding-back part to inwardly fold back the carrier film fed by the carrier film feeding unit;
a take-up unit configured to take up the carrier film from which the optical film is peeled off;
an optical cell feeding unit configured to feed an optical cell;
a bonding unit configured to bond the optical film, which is peeled off from the carrier film by the peeling unit, to the optical cell with the pressure-sensitive adhesive interposed therebetween, wherein the optical cell is fed by the optical cell feeding unit; and
a drive control unit configured to control a direction in which the carrier film is fed before the bonding is performed by the bonding unit, a velocity at which the carrier film is fed, or both of the direction and the velocity so that a difference between a first tension on the carrier film located upstream of the folding-back part and a second tension on the carrier film located downstream of the folding-back part is reduced.

8. The system according to claim 7, further comprising a first roller unit placed downstream of the folding-back part and configured to feed the carrier film, from which the optical film is peeled off, toward the take-up unit, wherein
when there is a difference between the first and second tensions, the drive control unit functions to reverse the direction of the rotation of the first roller unit before the bonding is performed by the bonding unit.

9. The system according to claim 8, further comprising a second roller unit placed upstream of the folding-back part and configured to feed the carrier film, on which the optical film is placed, toward the peeling unit, wherein when there is a difference between the first and second tensions, the drive control unit functions to increase the velocity of the rotation of the second roller unit before the bonding is performed by the bonding unit.

10. The system according to claim 7, further comprising a second roller unit placed upstream of the folding-back part and configured to feed the carrier film, on which the optical film is placed, toward the peeling unit, wherein
when there is a difference between the first and second tensions, the drive control unit functions to increase the velocity of the rotation of the second roller unit before the bonding is performed by the bonding unit.

* * * * *